June 7, 1960 A. R. RICHARD ET AL 2,939,253
CENTERLESS GRINDING AND BORING APPARATUS
Filed April 28, 1958 5 Sheets-Sheet 5

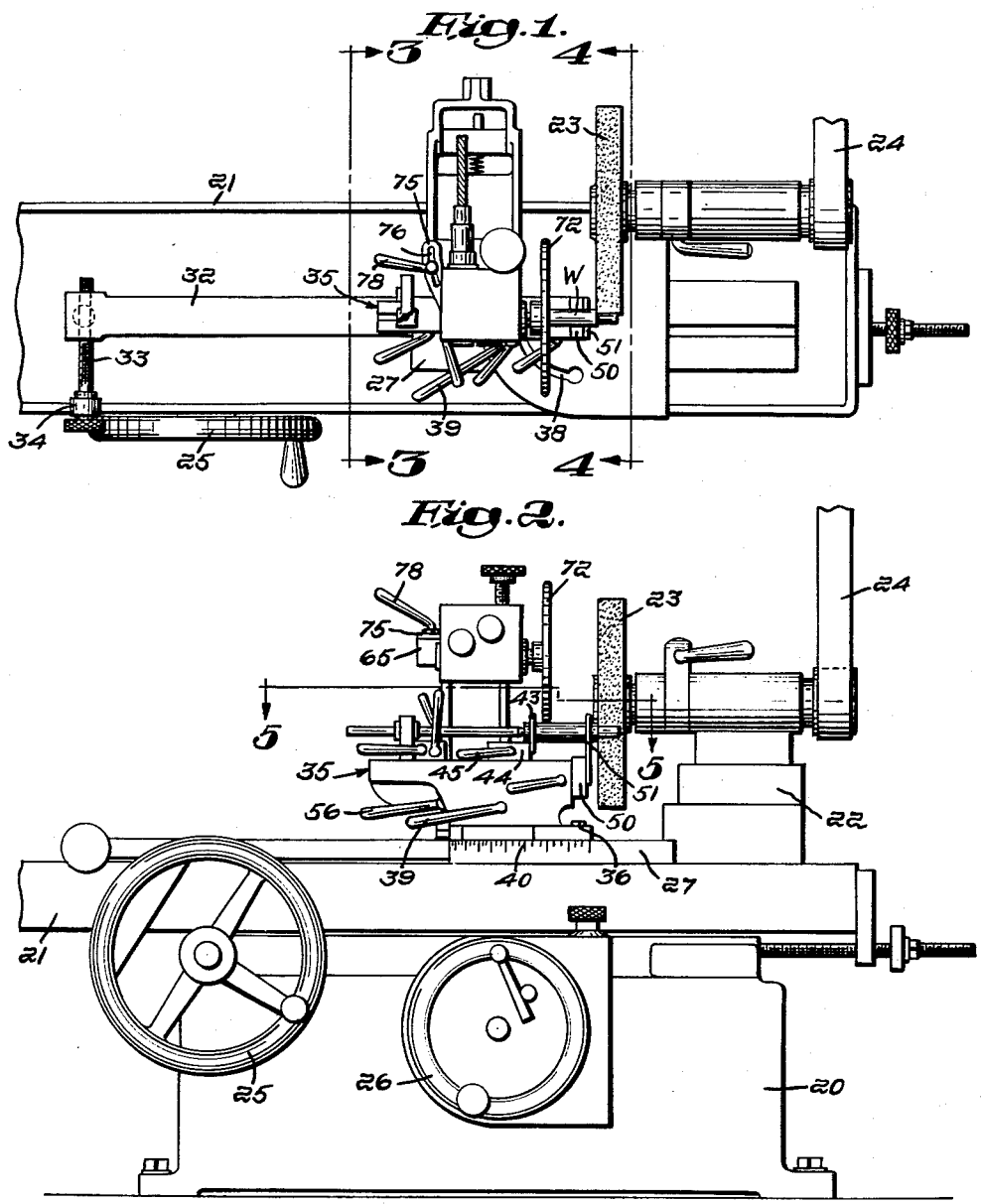

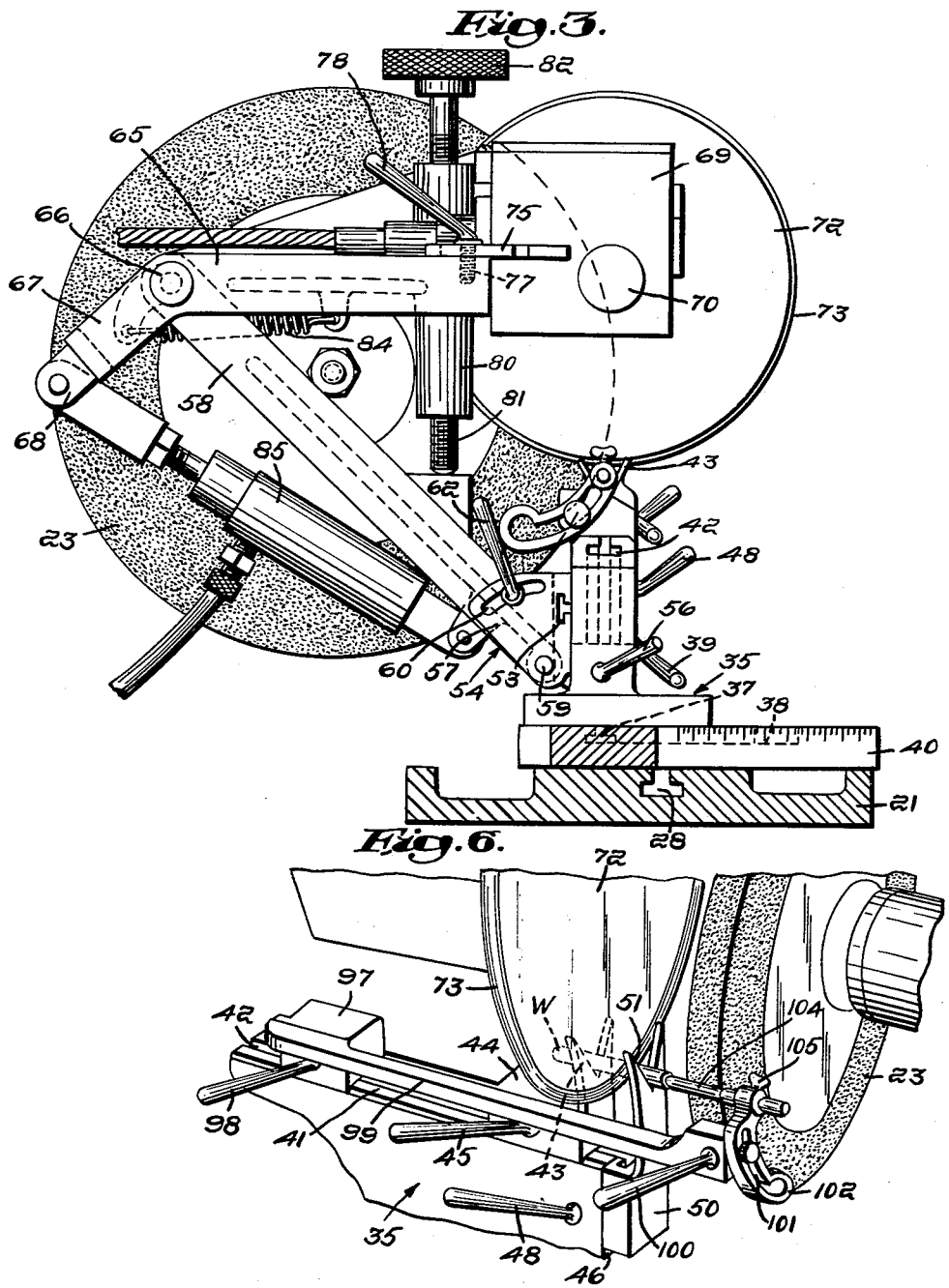

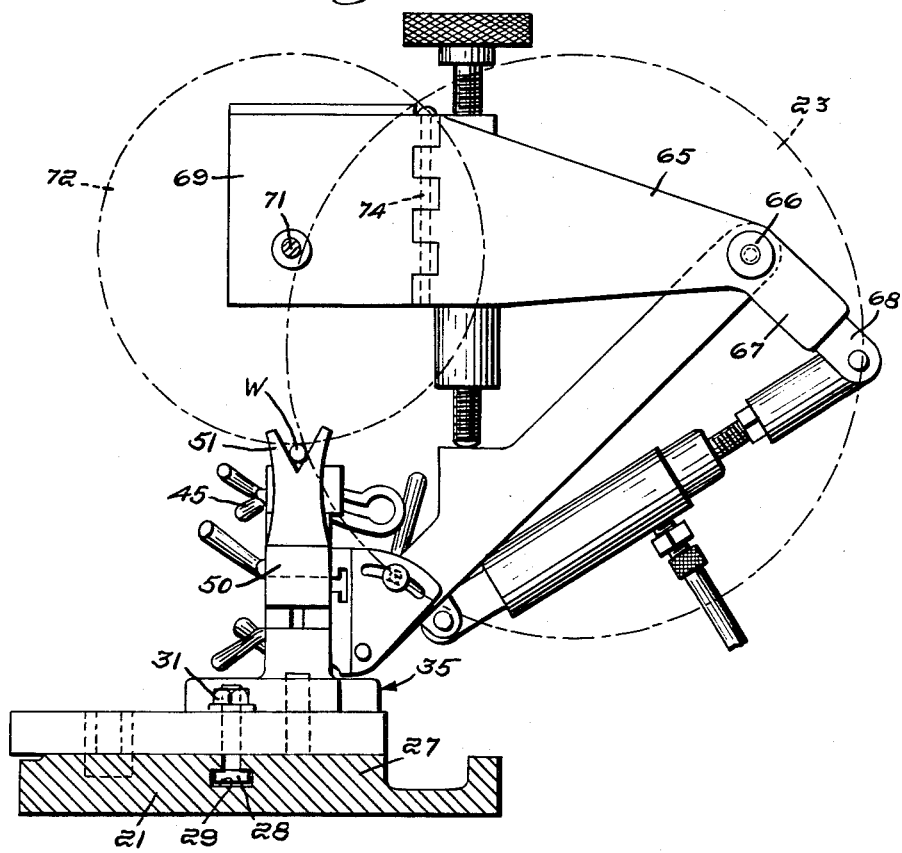
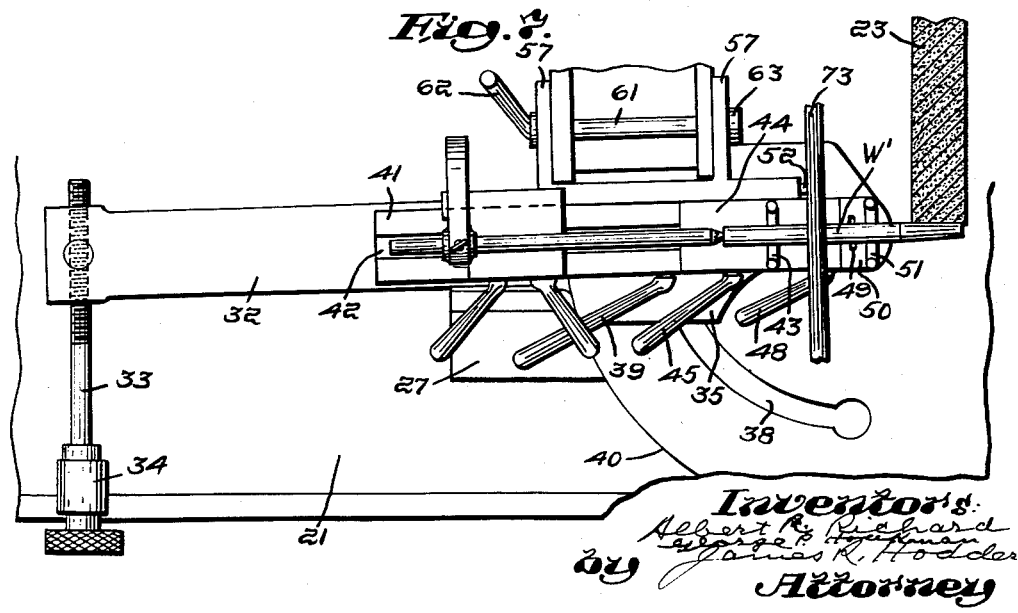

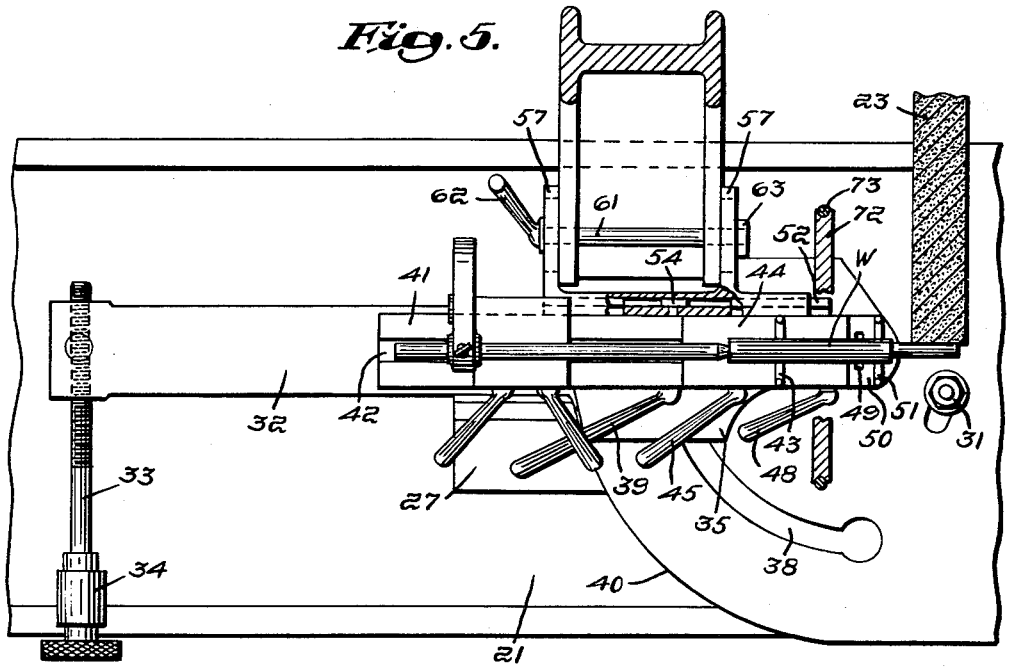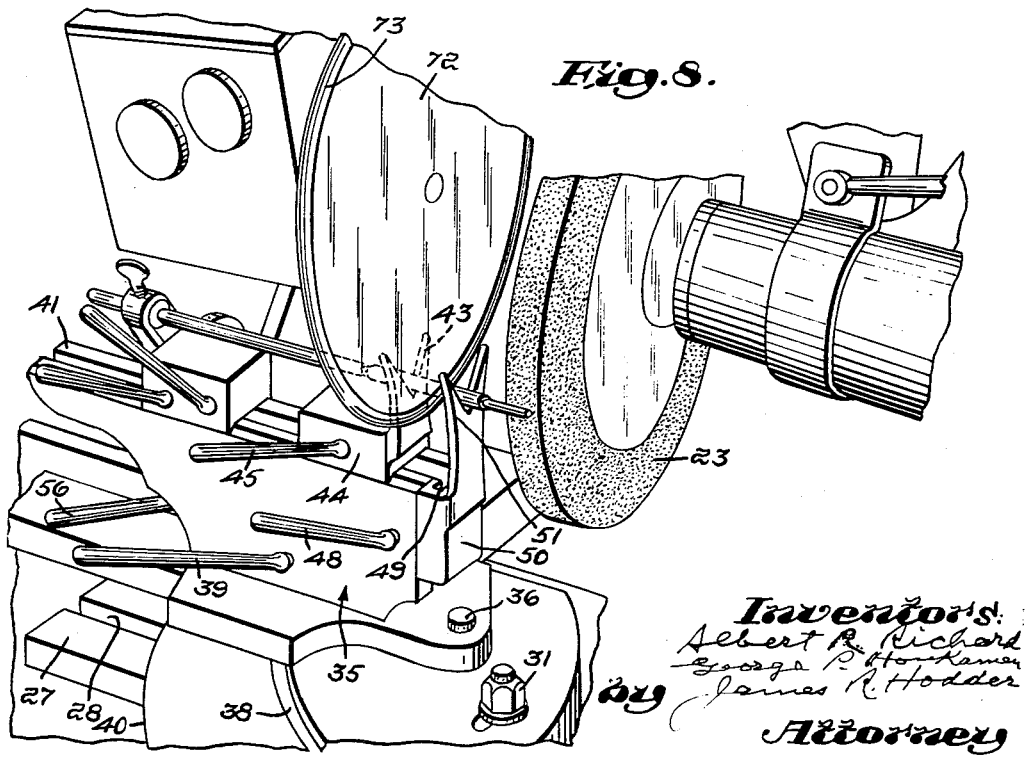

Inventors:
Albert R. Richard
George P. Houkanen
by James R. Hodder
Attorney

2,939,253

CENTERLESS GRINDING AND BORING APPARATUS

Albert R. Richard, Weymouth, and George P. Honkanen, Hingham, Mass., assignors to Woodruff & Stokes Company, Hingham, Mass., a corporation of Massachusetts Filed Apr. 28, 1958, Ser. No. 731,202

12 Claims. (Cl. 51—103)

The present invention relates to centerless grinding and boring apparatus and particularly to adjustable V-shaped work holders, to their support and to their adjustment.

In the production of work that must be ground within closely held tolerances, there is a demand for increased efficiency and economy. The principal objective of this invention is to meet that demand.

Apparatus in accordance with the invention has a grinding or boring element, a support of spaced, V-shaped work holders arranged and disposed to support a work piece with a portion to be worked on engaged by the element, and a driving wheel in engagement with another portion of the work both to rotate it and to hold it in the work holders.

It is preferred that apparatus for use in centerless grinding have one or more of the additional following features; adjustability of the work holders relative to their support and to each other, adjustability of the angular relation of the axis of the work to that of the grinding element; adjustability of the angle of the driving wheel relative to the axis of the work so that the driving wheel may function as a feed; and stops, adjustable relative to the axis of the work and adaptable to engage either end thereof.

Figure 9:
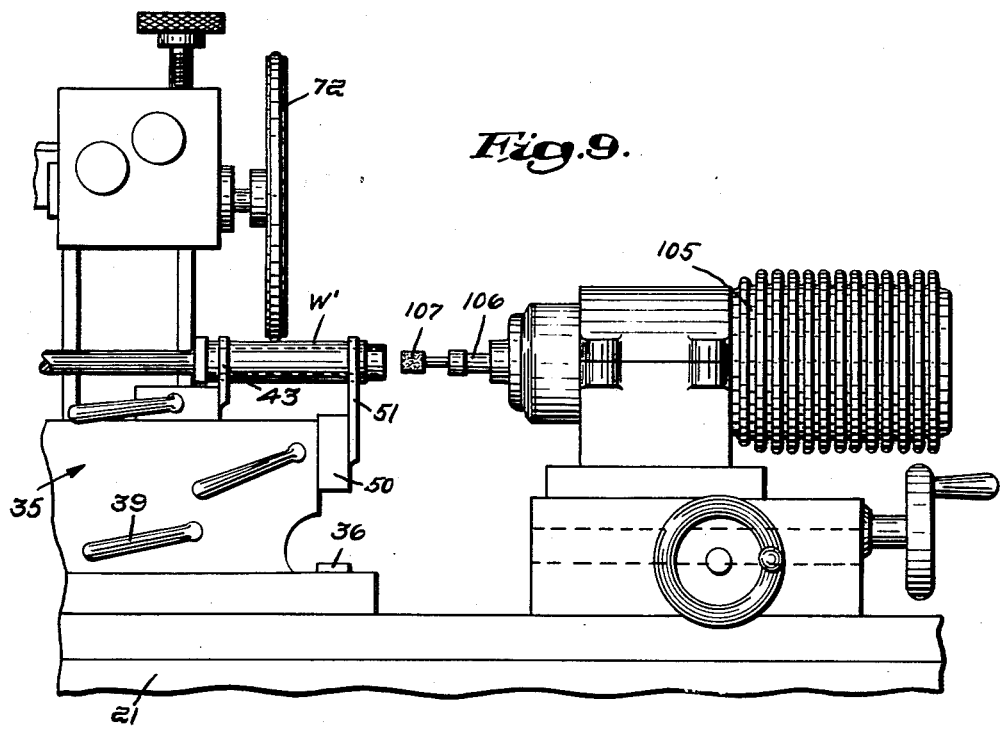
Figure 10:
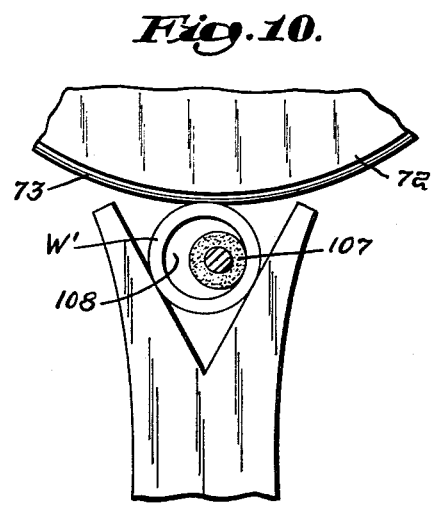

In the accompanying drawings, there are shown illustrative embodiments of the invention from which and from the accompanying description thereof, these and other of its objectives, novel features, and advantages will be readily apparent. In the drawings, Fig. 1 is a top plan view of apparatus in accordance with the invention, Fig. 2 is a front view thereof, Figs. 3 and 4 are sections, on an increased scale, taken approximately along the indicated lines 3—3 and 4—4, respectively, of Fig. 1, Fig. 5 is a section, on the scale of Figs. 3 and 4, taken approximately along the indicated lines 5—5 of Fig. 2, Fig. 6 is a fragmentary perspective view of certain parts of the apparatus with a work stop on the side of the grinding wheel opposite the V-shaped work holders, Fig. 7 is a fragmentary and partly sectioned plan view of certain parts of the apparatus arranged for tapering one end of the work with a work stop on the same side of the wheel as the V-shaped work holders, Fig. 8 is a fragmentary perspective of these same parts arranged as illustrated by Fig. 5, Fig. 9 is a fragmentary side view of an embodiment of the invention for use in internal boring and grinding, and Fig. 10 is a fragmentary view of the embodiment of Fig. 9 in which the grinding element is shown in section and the proximate holder is shown in end view.

In the embodiment of the invention illustrated by Figs. 1–8, there is shown apparatus having a base 20 provided with a bed 21 and a mount 22 for the grinding wheel 23 whose drive is indicated at 24. The bed 21 is longitudinally and transversely adjusted relative to the grinding wheel 23 by conventional mechanisms including hand wheels 25 and 26, respectively, but which are otherwise not detailed.

The bed 21 has a part 27 provided with an undercut slot 28 to receive the head of the pivot bolt 29 and hold it against turning. The bolt 29 extends upwardly through the mount 30 and is locked by the nut 31. The mount 30 has an arm 32 adapted to be swung by adjustments of the screw 33 carried by the bracket 34 on the bed 21.

A support 35 is attached to the mount 30 by the pivot 36 and by the headed keeper 37 slidable in the slot 38 that is arcuate with respect to the pivot 36, and which is undercut to accommodate the head of the keeper 37. The keeper 37 is part of a conventional, manually operated cam lock adapted to be rotated into locked or released positions by the handle 39 thus to bring the head of the keeper 37 into and out of clamping engagement with the mount 30. By this arrangement, the angular relation of the support 35 relative to the grinding wheel 23 may be varied as desired and it will be noted that the mount 30 has an edge 40 arcuate with respect to the pivot 36 and provided with suitable angle measuring indicia so that approximate adjustments can be made by moving the support 25 relative to the mount 30 and precise adjustments then made by moving the mount 30 relative to the bed 21 by means of the screw 33 as when the work piece W is to have one end tapered as illustrated by Fig. 7.

In order that the work may be supported in accordance with the invention, the top of the support 35 has a flat surfaced, horizontal way 41 extending from end-to-end thereof centrally of which there is an undercut channel 42. A V-shaped work holder 43 includes a slide 44 engageable with the way 41. In order that the work holder 43 may be moved into and locked in a desired position along the way 41, it is provided with a cam lock similar to that employed to lock the support 35 in place. Its operating handle is indicated at 45 and its headed keeper travels in the channel 42. It is preferred that the work engaging portions of the holder 43 be of arcuate section.

The end of the support 35 proximate the grinding wheel is a vertical, plain surfaced way 46 from which projects the headed end of the keeper 47 of a cam lock within the support 35 whose operating handle is indicated at 48. The head of the keeper is slidably entrant of an undercut channel 49 extending vertically from end-to-end of the way contacting face of the slide 50 at whose upper end there is a vertically disposed V-shaped work holder 51 whose vertex is in alignment with that of the holder 43 and whose work engaging faces are preferably arcuate in section.

With the structure as thus far detailed, it will be appreciated that both work holders are adapted to be adjusted relative to the support 35, one longitudinally and the other vertically with respect thereto, as required for the proper support of the work and then securely locked in any selected position.

In order to hold and rotate a work piece W in the holders and, in some instances, to cause its axial movement, one side of the support 35 is a vertical plane surface having a pair of spaced, longitudinally alined slideways 52 of T-shaped section dimensioned to slidably enter the undercut groove 53 in the flat surfaced face of the bracket 54 and extending from end-to-end thereof. Between the slideways 52, there is a keeper of a cam lock, generally similar to those above referred to, whose head is entrant of the groove 53 and whose operating handle is indicated at 56.

The bracket 54 has spaced ears 57 to which one end of an arm 58 is connected by a pivot 59. The ears 57 have arcuate slots 60 through which extend the ends of a rotatable member 61 provided at one end with an operating handle 62 and with its other end threaded into a nut element 63 held against rotation in the proximate slot 60 but slidable therein when the angular relation between the arm 58 and its bracket 54 is being changed.

A support 65 is pivoted as at 66 to the other end of the arm 58 adjacent which there is a depending yoke 67 provided with a central lug 68. At its other end, the support 65 has a gear box 69 having a drive shaft 70 and a driven shaft 71 on which is fastened a wheel 72 having a suitable friction driving surface 73. The gear box 69 is pivoted, as at 74, to one side of the support 65 and at its other side there is an ear 75 having an arcuate slot 76 through which extends a pin 77 threaded into the support 65 and provided with a handled clamping head 78 to enable the angle of the axis of the wheel 72 relative to the support 65 to be adjusted as required and then securely locked in place. The angle of wheel relative to the axis of the work determines the direction and rate of axial movement.

Adjacent the gear box 69, the support 65 has a boss 80 threaded to receive the screw 81 having a hand wheel 82 at its upper end and its lower end in supporting engagement with a seat 83 with which the arm 58 is provided. A spring 84 connected to the support 65 and the arm 58 yieldably maintains the screw 81 in engagement with the seat 83. A hydraulic jack 85 is pivotally connected to the lug 68 and to a pivot 86 carried by ears 87 on the arm 58 and is operable to raise the support 65 against the action of the spring 84. The controls for the jack 85 are not herein detailed.

It will be appreciated that, in most cases, it is necessary to provide stops to prevent or limit axial movement of the work piece. For that purpose, a slide 88 is provided that is adapted to engage with the way 41. The slide 88 has a cam lock whose operating handle is indicated at 89 and whose headed keeper is adapted to be entered into the slot 42. From the rear face of the slide 88, the head of a keeper of another cam lock projects whose operating handle is indicated at 91.

A stop 92 is slidably clamped as at 93 to a holder 94 having an arcuate slot 95 slidable on the headed keeper associated with the locking handle 91 and terminating in an opening 96 dimensioned to permit the holder 94 to be detached from the slide 88. By this arrangement, the stop 92 can be adjusted both vertically and longitudinally relative to the support 35 to engage one end of the work piece W.

When it is desired to employ a head stop, a slide 97, see Fig. 6, is employed that is similar to the slide 88. The handle of its cam lock is indicated at 98 and it has an offset arm 99 arranged and disposed to enable the grinding and driving wheels to be by-passed. At its free end, there is a cam lock whose handle is indicated at 100 and which has its headed keeper extending through the arcuate slot 101 of a holder 102. The arcuate slot 101 has an end opening 103 enabling the holder 102 to be detached and the holder slidably supports the stop 104 with a set screw 105 being provided for locking the stop 104 in position. The stop 104 is thus both longitudinally and vertically adjustable relative to the support 35.

From the foregoing, it will be appreciated that the invention is well adapted to meet the requirements of a centerless grinder with respect to efficiency, economy, accuracy, and ease of operation. The invention is also adapted for use in internal grinding operations as is suggested by Figs. 9 and 10 wherein, in place of the grinding wheel, there is shown a motor 105 having a chuck 106 holding a grinding or boring element 107 within the cavity 108 of a work piece W.

What we therefore claim and desire to secure by Letters Patent is:

1. In centerless grinding and boring apparatus, a rotatable grinding element, a support including a pair of spaced V-shaped work holders arranged and disposed on the same side of a plane at right angles to the axis of the element to support a work piece with a protruding end portion to be ground engaged by said grinding element, and a driving wheel disposed and arranged for engagement with a portion of said work piece between said holders to rotate the workpiece and hold it therein.

2. In centerless grinding and boring apparatus, a rotatable grinding element, a support including a pair of spaced V-shaped work holders arranged and disposed on the same side of a plane at right angles to the axis of the element to support a work piece with a protruding end portion to be ground in engagement with said grinding element, and means including a driving wheel in engagement with a portion of said work piece between said holders to rotate the work piece and hold it therein, said means including a pair of pivotably joined members, adjustable hinge means connecting one of said members to said support with the pivot axis of said members in parallel with the work axis, and an adjustable hinge connection between said wheel and the other of said members, the axis of said connection being at right angles to said work axis.

3. In centerless grinding and boring apparatus, a rotatable grinding element, a support including a pair of spaced V-shaped work holders arranged and disposed on the same side of a plane at right angles to the axis of the element to support a work piece with a protruding end portion to be ground engaged by said grinding element, and means including a driving wheel in engagement with a portion of said work piece between said holders to rotate the work piece and hold it therein, said means including a pair of pivotably joined members, one of said members being connected to said support with the pivot axis of said members in parallel with the work axis to enable the other member to swing said wheel into and out of engagement with said work piece, said driving wheel being connected to said other member, spring means yieldably urging said other member towards said work holders, and fluid pressure operated means between said members operable to swing said other member away from said work holders.

4. In a centerless grinder, a rotatable grinding element, a pivotable mount including a screw feed adjustment therefor, a support pivotably connected to said mount and including a lock for holding said support against movement relative to said mount, said support including a pair of spaced V-shaped work holders arranged and disposed on the same side of a plane at right angles to the axis of the element to support a work piece with a protruding end portion to be ground in engagement with said grinding element, and a driving wheel in engagement with a portion of said work piece between said holders to rotate the work piece and hold it therein.

5. In centerless grinding and boring apparatus, a rotatable grinding element, a support, a pair of spaced V-shaped work holders arranged and disposed on the same side of a plane at right angles to the axis of the element, to support a work piece with a protruding end portion to be ground engaged by said grinding wheel, one work holder being adjustably attached to said support for movement in a longitudinal direction and the other work holder being adjustably attached to said support for movement in a vertical direction, and a driving wheel in engagement with a portion of said work piece between said holders to rotate said work piece and hold it therein.

6. In centerless grinding and boring apparatus, a rotatable grinding element, a support including a pair of spaced V-shaped work holders arranged and disposed on the same side of a plane at right angles to the axis of the element to support a work piece with a protruding end portion to be ground in engagement with said grinding wheel, a driving wheel in engagement with a portion of said work piece between said holders to rotate said work piece and hold it therein, and means to adjust the angular relation between said driving wheel and the axis of said work piece to enable said driving wheel to become operative to urge said work piece to move axially.

7. In centerless grinding and boring apparatus, a rotatable grinding element, a support including a pair of spaced V-shaped work holders arranged and disposed on the same side of a plane at right angles to the axis of the element to support a work piece with a protruding end portion to be ground in engagement with said grinding wheel, a driving wheel in engagement with a portion of said work piece between said holders to rotate said work piece and hold it therein, means to adjust the angular relation between said driving wheel and the axis of said work piece to enable said driving wheel to become operative to urge said work piece to move axially, and a stop carried by said support and adjustable relative thereto for engagement with one end of said work piece.

8. In centerless grinding and boring apparatus, a grinding wheel, a support at one side of said wheel including a pair of spaced V-shaped work holders arranged and disposed on the same side of a plane at right angles to the axis of the element to support a work piece with a protruding end portion to be ground engaged by said grinding wheel, a driving wheel in engagement with a portion of said work piece between said holders to rotate said work piece and hold it therein, means to adjust the angular relation between said driving wheel and the axis of said work piece to enable said driving wheel to become operative to urge said work piece axially towards said grinding wheel, and a stop carried by said support and adjustable relative thereto for engagement with one end of said work piece, said stop including an offset to by-pass said grinding wheel.

9. In centerless grinding and boring apparatus, a rotatable grinding element, a support, a pair of spaced V-shaped work holders arranged and disposed on the same side of a plane at right angles to the axis of the element to support a work piece with a protruding end portion to be ground in engagement with said grinding wheel, one work holder being adjustably attached to said support for movement in a longitudinal direction and the other work holder being adjustably attached to said support for movement in a vertical direction, a driving wheel in engagement with a portion of said work piece between said holders to rotate said work piece and hold it therein, means to adjust the angular relation between said driving wheel and the axis of said work piece to enable said driving wheel to become operative to urge said work piece axially, and a stop carried by said support adjustable relative thereto into a position determined by said work holders in which it engages the work piece axially.

10. In centerless grinding and boring apparatus, a grinding element, a support spaced from said element and including a horizontal way and a vertical way, and a pair of slides, one for each way and adjustably locked thereto, each slide including a vertically disposed, V-shaped holder for use in supporting the work in desired relation to said element with a protruding end portion engageable therewith.

11. In centerless grinding and boring apparatus, a grinding element, a support spaced from said element and including a horizontal way and a vertical way, a pair of slides for supporting a work piece in desired relation to said element, one slide for each way and adjustably locked thereto, each slide including a vertically disposed, V-shaped work holder for use in supporting the work in desired relation to said element and with a protruding end portion engageable therein, a third slide adjustably locked to said horizontal way, a stop member slidably connected to said third slide for movement into an axial engagement with the work piece when supported by said work holders, and means to lock said stop member to said third slide.

12. In a centerless grinder, a rotatable grinding element, a pivotable mount including adjusting means therefor, a support pivotably connected to said mount for movement in a plane parallel thereto and including a lock for holding said support against movement relative to said mount, said support including a pair of spaced V-shaped work holders arranged and disposed on the same side of a plane at right angles to the axis of the element to support a work piece with one end protruding for engagement with said grinding wheel at a selected angle, and a driving wheel in engagement with said work piece between said holders to rotate it and hold it in said holders, and stop means engageable with the other end of said work piece.

References Cited in the file of this patent

UNITED STATES PATENTS 2,141,065    Haas _____ Dec. 20, 1938
2,743,555    Irvine _____ May 1, 1956

Disclaimer 2,939,253.—*Albert R. Richard*, Weymouth, and *George P. Honkanen*, Hingham, Mass. CENTERLESS GRINDING AND BORING APPARATUS. Patent dated June 7, 1960. Disclaimer filed Nov. 7, 1973, by the assignee, *Woodruff & Stokes Company*.

Hereby enters this disclaimer to all claims of said patent.

[*Official Gazette February 19, 1974.*]